Inventor.
Arthur S. Brown
Attys.

Patented Sept. 23, 1941

2,256,756

UNITED STATES PATENT OFFICE 2,256,756

POWER TRANSMISSION BELT

Arthur S. Brown, Tilton, N. H., assignor to Arthur S. Brown Manufacturing Company, Tilton, N. H., a corporation of New Hampshire Application November 7, 1939, Serial No. 303,249

1 Claim. (Cl. 74—232)

This invention relates to endless power transmission belts and it has for one of its objects to provide a novel endless belt which is relatively simple to manufacture, which has excellent wearing qualities, and which has the further characteristic that it will not stretch appreciably when it is put into use.

My improved belt is a three ply belt, and comprises an inner wear-receiving endless ply of fabric, an outer endless load-supporting ply formed of cords extending longitudinally of the belt and which are held together in their parallel relation by small threads interwoven with the cords, and an intermediate ply of rubber to which the outer and inner plies are vulcanized, thereby forming a unitary endless belt structure.

In order to give an understanding of the invention I have illustrated in the drawing a selected embodiment thereof and have also shown some of the steps employed in manufacturing the belt.

Figure 1:
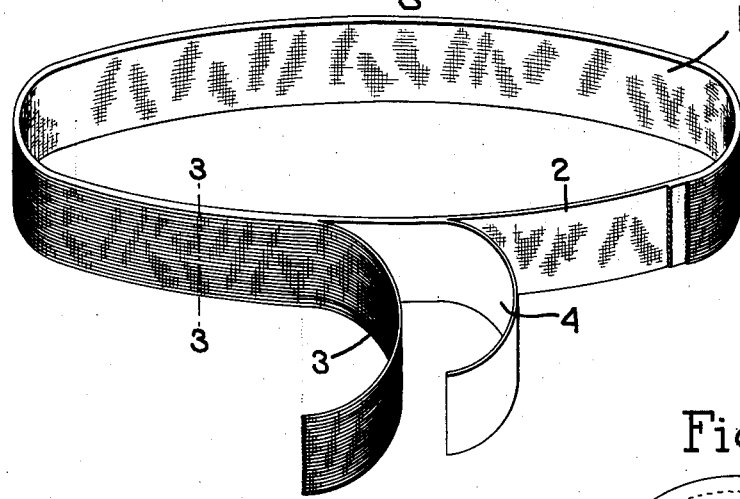
Fig. 1 is a perspective view of an endless power transmission belt embodying my invention, portions of the load-supporting ply and the intermediate rubber ply being broken out and turned back to better show the construction.

Referring first to Fig. 1 the endless belt as a whole is indicated at 1, and as stated above, it comprises an inner wear-receiving ply 2, an outer load-supporting ply 3 and an intermediate ply 4 of rubber to which the inner and outer plies are vulcanized.

Both the inner ply 2 and the outer ply 3 are endless plies so that when the three plies are assembled together an endless belt will be produced.

Figure 5:
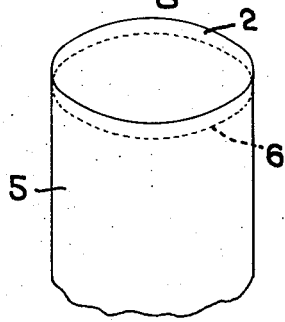
Fig. 5 is a view on a smaller scale of a portion of the tubular fabric from which the inner wear-resisting ply of the belt is taken.

The endless ply 2 of the belt may be made in any suitable way, but a convenient way is to first weave a tubular fabric 5, as illustrated in Fig. 5, which has a circumferential dimension corresponding to that of the belt to be manufactured, and then to cut from the end of the fabric a section 2 of a width equal to the width of the belt 1 to be made. If, for instance, the tubular fabric were cut transversely along the dotted line 6 this would produce an endless ply 2 of fabric suitable for the inner ply of the belt 1.

To produce the endless outer ply 3 of the belt I propose first to weave a tubular fabric 7 having a circumferential dimension corresponding to that of the belt to be made, said fabric 7 being formed by interweaving a cord-like weft thread 8 with relatively small warp threads 9.

In weaving this tubular fabric the cord-like weft thread 8 is laid in the fabric in successive turns 10 having a close parallel arrangement and the crimping of the interwoven threads 9 and 8 is located entirely in the small warp threads 9, the turns 10 of the cord-like weft thread 8 extending substantially straight and being free from any crimping due to the weaving operation.

Figure 4:
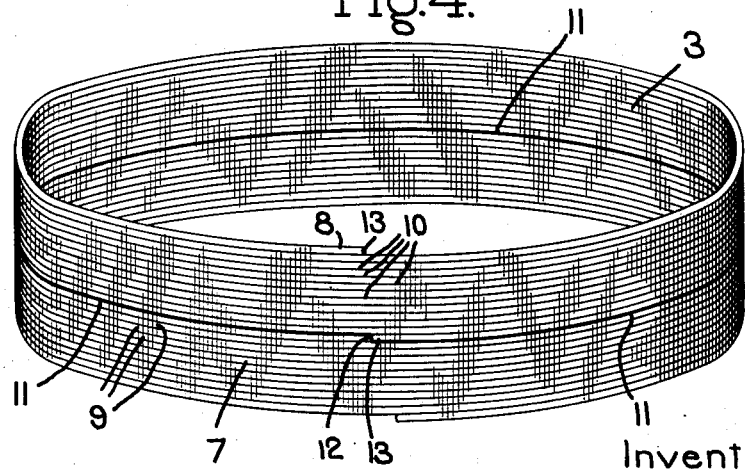
Fig. 4 is a fragmentary view of the tubular fabric from which the load-supporting ply of the belt is formed.

To secure the endless ply 3 I propose to cut from the tubular fabric 7 a length having a width corresponding to the width of the belt, such length being indicated at 3 in Figure 4. This length which is thus cut from the tubular fabric 7 forms an endless and seamless piece of fabric which constitutes an endless and seamless load-supporting ply for the belt that has the cord-like thread 8 lying straight and without any crimping due to the weaving operation. In severing the length 3 from the fabric 7 I propose to cut the fabric between two adjacent turns 10 of the cord 8, as shown by the dark line in Figure 4, and by cutting the fabric in this way the cord 8 will be cut only once at the point 12, so that the ply 3 will have in each edge only one cord end 13. The ply 3, therefore, is an endless ply having a single continuous cord 8 extending around and around said ply a plurality of times with the adjacent turns parallel to each other and held closely together in their parallel relation by the relatively small warp threads 9. Said ply will thus have the full strength of all of the turns 10 of the cord member 8 which extends between each edge of the ply.

Since the cord 8 lies straight in the fabric 7 and has no crimping due to the weaving operation, the ply thus produced will have no tendency to stretch when the load is applied thereto.

There is thus provided an endless ply 3 for the load-supporting element of the belt.

Figure 2:
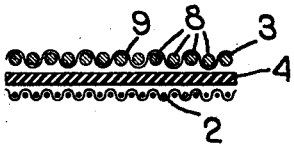
Fig. 2 is a fragmentary sectional view showing the three plies of the belt in proper relative position but spaced from each other.
Figure 3:
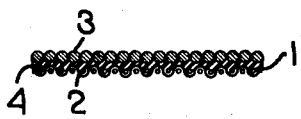
Fig. 3 is an enlarged section through the belt on the line 3—3 of Fig. 1.

After the two plies 2 and 3 have been provided, as above described, then the belt is completed by assembling these two layers with the inner wear-resisting ply 2 within the outer load-supporting ply 3 and a ply or strip of partially cured rubber 4 located between the plies 2 and 3, as indicated in Fig. 2. This assembling of the three plies may be done on a suitable form or in any approved way, but in any event, after the three plies have been thus assembled and brought firmly into contact with each other then the assembled plies are subjected to a vulcanizing operation by which the partially cured rubber ply 4 becomes vulcanized to the inner and outer plies 2 and 3, thereby producing a unitary endless belt structure, which has an efficient wear-resisting inner ply 2 and a non-stretchable load-supporting outer ply 3.

Since the section or ply 3 is cut from the tubular fabric 7 along a line 11 parallel to the turns 10 of the cord 8 the belt will have in each edge only one cord end 13. In severing the section 3 the small warp threads 9 are, of course, cut but these small warp thread ends become firmly embedded in the rubber at the edge of the belt during the vulcanizing and the molding operation, so that the belt presents smooth edges.

If desired, the fabric ply 2 and the ply 3 having the cords 8 may be rubberized either by spraying rubber compound on them or dipping them into a rubber compound, or in any other suitable way, before they are assembled with the rubber ply 4, the rubberizing of these plies 2 and 3 resulting not only in securing a firmer union between the plies and the rubber ply 4, but also serving to strengthen the plies individually, because the rubberizing operation has the effect of binding together the threads of each fabric.

It would be within my invention to use two or more layers of fabric for the fabric ply 2, and if desired, two or more layers of the cord fabric 3 could be used as the load supporting ply of the belt. Where each ply is made of one or more layers, such layers of each ply may be united in any approved way.

I claim:

An endless power transmission belt comprising an endless and seamless inner ply of fabric, which inner ply constitutes the wear surface of the belt, an endless and seamless outer load-supporting ply having a single continuous unbroken cord extending round and round the endless ply a plurality of times with the adjacent turns of the cord lying parallel and closely arranged and held in their parallel arrangement by relatively small threads which are interwoven with the turns of the cord, the entire crimp of the interwoven thread and cord due to the weaving operation being in the small threads and the turns of the cord lying straight, and an intermediate ply of rubber which is situated between the inner and outer plies and is united to both of them.

ARTHUR S. BROWN.